US 12,153,415 B2

(12) United States Patent
Kerbel et al.

(10) Patent No.: US 12,153,415 B2
(45) Date of Patent: *Nov. 26, 2024

(54) METHODS AND APPARATUSES FOR DETECTING FAULTS IN HVAC SYSTEMS BASED ON LOAD LEVEL PATTERNS

(71) Applicant: ENCYCLE TECHNOLOGIES, INC., San Marcos, CA (US)

(72) Inventors: Mark Kerbel, Totonto (CA); Peter B. Malcolm, Woodstock (GB)

(73) Assignee: ENCYCLE TECHNOLOGIES, INC., San Marcos, CA (US)

(*) Notice: Subject to any disclaimer, the term of this patent is extended or adjusted under 35 U.S.C. 154(b) by 280 days.

This patent is subject to a terminal disclaimer.

(21) Appl. No.: 17/585,251

(22) Filed: Jan. 26, 2022

(65) Prior Publication Data
US 2022/0206484 A1 Jun. 30, 2022

Related U.S. Application Data

(63) Continuation of application No. 15/484,666, filed on Apr. 11, 2017, now Pat. No. 11,269,320.
(Continued)

(51) Int. Cl.
*G05B 23/02* (2006.01)
*F24F 11/30* (2018.01)
(Continued)

(52) U.S. Cl.
CPC .......... *G05B 23/0235* (2013.01); *F24F 11/30* (2018.01); *F24F 11/38* (2018.01);
(Continued)

(58) Field of Classification Search
CPC ... B60H 1/00428; B60H 1/3222; F24F 11/30; F24F 11/62; F24F 11/63; F24F 11/32;
(Continued)

(56) References Cited

U.S. PATENT DOCUMENTS 5,537,830 A * 7/1996 Goshaw ................ F25B 49/022
62/201
8,904,814 B2 * 12/2014 Tolbert, Jr. .......... F04B 39/0207
62/230
(Continued)

OTHER PUBLICATIONS

Hitchin et al., "Daily energy consumption signatures and control charts for air-conditioned buildings", 2015, Energy and Buildings. (Year: 2015).*

*Primary Examiner* — Mohammad K Islam
(74) *Attorney, Agent, or Firm* — Vorys, Sater, Seymour, and Pease LLP; Iona N. Kaiser

(57) ABSTRACT

Methods and systems are described for detecting a wide variety of fault conditions in a HVAC system based on analysis of current and historical energy consumption patterns, and on comparison with energy consumption patterns of other similarly situated RTUs. Energy consumption comparisons are preferably made in regard to a normalized load ratio or NLR or more preferably to a daily maximum normalized load ratio or MDNLR, which provide more robust and reliable bases for comparison of faulty and fault-free RTUs, and hence for generalized fault detection, than other previously known metrics or criteria.

5 Claims, 3 Drawing Sheets

Related U.S. Application Data

(60) Provisional application No. 62/322,092, filed on Apr. 13, 2016.

(51) Int. Cl.
 *F24F 11/32* (2018.01)
 *F24F 11/38* (2018.01)
 *G05B 15/02* (2006.01)
 *G06Q 50/06* (2024.01)

(52) U.S. Cl.
 CPC .............. *G05B 15/02* (2013.01); *F24F 11/32* (2018.01); *G05B 2219/24033* (2013.01); *G05B 2219/2614* (2013.01); *G06Q 50/06* (2013.01)

(58) Field of Classification Search
 CPC .......... F24F 11/38; F24F 11/46; F24F 11/523; F24F 11/58; F24F 11/88; F24F 2110/10; F24F 2140/00; F24F 2140/50; G05B 23/0235; G05B 15/02; G05B 2219/24033; G05B 2219/2614; G06Q 50/06

See application file for complete search history.

(56) References Cited

U.S. PATENT DOCUMENTS

| | | | |
|---|---|---|---|
| 9,285,802 B2 * | 3/2016 | Arensmeier | F24F 11/38 |
| 2002/0090304 A1 * | 7/2002 | Yoo | F04B 35/045 |
| | | | 417/44.1 |
| 2006/0182635 A1 * | 8/2006 | Jayanth | F04C 23/008 |
| | | | 417/63 |
| 2007/0056300 A1 * | 3/2007 | Crane | F25B 49/025 |
| | | | 62/175 |
| 2010/0239934 A1 * | 9/2010 | Bono | H01M 8/04395 |
| | | | 429/442 |
| 2010/0286937 A1 * | 11/2010 | Hedley | G06Q 50/06 |
| | | | 702/60 |
| 2011/0196573 A1 * | 8/2011 | Lee | B60H 1/3222 |
| | | | 701/36 |
| 2011/0206538 A1 * | 8/2011 | Yokota | F04B 49/065 |
| | | | 417/1 |
| 2012/0230840 A1 * | 9/2012 | Fletcher | F04B 41/06 |
| | | | 417/43 |
| 2014/0039844 A1 * | 2/2014 | Strelec | G06F 30/13 |
| | | | 703/1 |
| 2014/0074730 A1 * | 3/2014 | Arensmeier | F24F 11/38 |
| | | | 705/305 |
| 2014/0096946 A1 * | 4/2014 | Rognli | F24F 11/62 |
| | | | 165/212 |
| 2014/0222394 A1 * | 8/2014 | Drees | G06F 30/20 |
| | | | 703/2 |

* cited by examiner

METHODS AND APPARATUSES FOR DETECTING FAULTS IN HVAC SYSTEMS BASED ON LOAD LEVEL PATTERNS

CROSS-REFERENCE TO RELATED APPLICATION

This Application is a continuation of application Ser. No. 15/484,666 filed Apr. 11, 2017, and now allowed, and which claims priority to U.S. Provisional Patent Application No. 62/322,902 filed Apr. 13, 2016.

TECHNICAL FIELD

Methods and systems for detecting one or more fault conditions in at least one HVAC system are provided, the systems comprising the analysis of current and historical energy consumption patterns, and then comparing with energy consumption patterns of other similarly-situated HVAC systems. More specifically, the present systems are operative to utilize a normalized load ratio, or a daily maximum normalized load ratio, providing more robust and reliable data for comparison of faulty and fault-free HVAC systems.

BACKGROUND

It is often noted that energy consumption by HVAC (heating, ventilating, and air conditioning) systems accounts for about 40% of total building consumption and about 15% of total worldwide energy consumption. However, it is often the case that building HVAC systems underperform due to faults that go undetected, resulting in loss of efficiency and/or increased energy consumption.

For example, component malfunctions in a typical rooftop unit HVAC system can cause the system to inefficiently run its heating and/or cooling units, and potentially fail to keep a zone served by the unit at the desired temperature. A rooftop unit or "RTU" is a packaged HVAC unit typically comprising a supply fan, a cooling unit, and a heating unit. The supply fan's function is to draw air through the rooftop unit's heating and cooling sections and deliver it to a space served by the RTU. Cooling is accomplished by refrigeration, and the entire refrigeration cycle (compressor, condenser, and evaporator) is contained within the cooling unit. The heating unit of the RTU is typically a gas-fired or electric furnace. Smaller RTUs, in the range of a few tons (one ton equals 12,000 BTUH), are normally single stage units, meaning they have only one stage of heating and one compressor. Larger RTUs typically have two (or more) stages of heating and cooling. Two-stage heating may be accomplished by a two-stage gas valve, which assumes a partially open position upon a call for one stage, and a fully open position upon a call for both stages. Multi-stage evaporative cooling is accomplished by staging compressors; e.g., an RTU with two stages of cooling has at least two compressors. The failure of one or more stages of heating or cooling can result in an increase or decrease of power consumption by the RTU relative to power consumption when operating normally.

A RTU employed to serve a single zone is typically controlled by a multistage heating-cooling thermostat mounted in its zone and wired back to the unit. Common among most constant volume rooftop units that are designed to perform single zone heating and cooling is the "low-voltage terminal strip". For a two-stage cooling, two-stage heating RTU, the thermostat's control terminals are as follows: R, Y1, Y2, W1, W2, and G. R is 24 volts "hot" as derived from the rooftop unit's control transformer, W1 and W2 correspond to stages of heat, Y1 and Y2 correspond to stages of cooling, and G corresponds to the supply fan. A three-stage system will have Y3 and W3 control terminals. The thermostat controls the modes of operation of the RTU; e.g., whether the fan should run, how many cooling or heating stages to engage, etc. Heating and cooling control is based on two parameters, setpoint and zone temperature, where the setpoint is usually set manually by the occupant. For smart thermostats, zone temperature is measured by an integral sensor, usually a thermistor which is inexpensive but is less accurate and stable than other sensors such as resistance temperature detectors or RTDs. Zone temperature is determined by the thermostat sensor and compared to the setpoint, and the appropriate action is taken to engage either heating or cooling to bring the zone temperature to the setpoint. For example, if the sensed temperature is only slightly above the setpoint, then the thermostat will return 24 volts to just the Y1 terminal of the rooftop unit, and the first-stage cooling will engage. If, on the other hand, the temperature is substantially above the setpoint, then the thermostat may return 24 volts to both the Y1 and the Y2 terminals of the rooftop unit so as to engage both first and second stage cooling. Some smart thermostats employ sophisticated multistage control strategies such as PID (proportional, integral, differential) feedback loops for improved performance and efficiency.

Damper systems that allow variable amounts of outside air to be added to the HVAC system are frequently incorporated into RTUs. These "economizers" can save a great deal of energy, but can also waste energy if not operating properly. For example, during the cooling season, if an outside air damper does not close properly when the outside air temperature and/or humidity are high, the air conditioning compressor must operate longer and/or at higher loads, thus consuming a great deal more energy than necessary. Similarly, if a damper is open too far during the heating season, letting in excessive cool outside air, the heating system must expend energy heating the extra outside air entering the structure. The costs associated with these increased heating and cooling loads due to economizer malfunction can be quite high. As above, a fault regarding the damper system can result in an increase or decrease of power consumption relative to the power consumption of the RTU when operating normally.

As illustrated by the above examples, HVAC faults are typically associated with changes in energy consumption patterns, characterized by a marked increase or decrease in power consumption level and a concomitant loss in system efficiency. Thus, unexplained changes in energy consumption can be an indicator of equipment malfunction. Typical HVAC FDD (fault detection and diagnosis) methods rely on analyzing data from various sensors such as temperature, pressure, air flow, etc. However, these types of FDD systems are generally rather complicated and expensive to deploy and maintain. Consequently, FDD systems have had limited acceptance, especially for small to medium size installations.

According to the California Energy Commission's Public Interest Energy Research Program (PIER), most common HVAC faults have an associated loss in efficiency and increase in total energy consumption. Rising energy costs have given rise to building automation or building management systems ("BAS" or "BMS") that manage electrical loads of such HVACs. A BAS or BMS may include sensors for measuring energy consumption of the various loads in the system, including in particular, HVAC rooftop units, or RTUs. The operation of RTUs are sometimes coordinated with the goal of avoiding excessive energy use peaks that can occur if the units operate independently and randomly. Thus, measurement of RTU energy consumption and rate is a necessary and integral part of coordinating their operation. For example, U.S. Pat. No. 8,527,109 to Kulyk and Kerbel describes methods and apparatuses for coordinating a plurality of loads by enabling or disabling the loads over successive time segments so as to minimize energy use spikes. The method relies on measuring the energy consumption of each load during each time segment relative to a maximum potential energy consumption level for the particular RTU. A very general term for this metric, as defined and used in the cited patent, is "load enabled utilization value," which is used to determine a corresponding duty cycle pattern to which the load is scheduled to operate. It has since been discovered that load enabled utilization value data can be correlated with several RTU fault types.

There remains a need for a simpler, more economical approach to detecting and triggering alerts for HVAC faults, one that preferably relies on a simplified analysis using data that can be readily obtained in most HVAC installations with minimal additional equipment.

SUMMARY

According to embodiments herein, apparatus and methodologies of fault detection in HVAC systems are provided, such HVAC systems comprising at least one or a plurality of energy consuming units including, without limitation, roof top units (RTUs), chillers, compressors, and the like. The present systems measure and analyze load enabled utilization value data from the energy consuming units, and then to compare the data for a given energy consuming unit with the unit's historical behavior and the behavior of its peers (i.e. other units in the system).

Load enabled utilization values can provide an indication of how aggressively a unit (referred to herein as a "load") is operating, which varies over the course of a day as various external factors and environmental conditions change. For example, for RTUs in particular, load enabled utilization values tend to be cyclical on a daily basis and may also vary over successive days as weather conditions change. Occupancy and other factors can also have significant, but usually transitory effects. Thus, on average, the operation of a normally operating RTU follows a fairly predictable daily pattern than may vary slowly from day to day as weather and other conditions change. It is an advantage that the present system can exploit readily available energy consumption data to identify RTUs and similar equipment that exhibit unusual energy consumption patterns, indicative of a broad range of fault types and conditions. By relying upon the comparison of energy consumption patterns of an HVAC system with its own historical energy consumption patterns and with the energy consumption patterns of other similarly situated HVAC systems, the present system provides a greatly simplified, more economical, method for identifying fault conditions in electric power consuming loads.

According to embodiments herein, a computer implemented system for detecting one or more fault conditions in at least one HVAC unit is provided, the system comprising at least a processor operative to receive energy consumption data pertaining to the operation of the at least one HVAC unit, to determine, from the energy consumption data, an average energy consumption value corresponding to each of a plurality of time segments over predetermined time periods of the operation of the at least one HVAC unit, to determine ratios of the determined average energy consumption values relative to a known or estimated maximum average energy consumption value for the at least one HVAC unit to obtain normalized load values corresponding to the each of a plurality of time segments in the plurality of predetermined time periods, to determine maximum normalized load values among the normalized load values within each of the plurality of predetermined time periods, to compare the maximum normalized load values to a predetermined fault level threshold and, when the comparison exceeds the predetermined fault level threshold, automatically report the fault condition in the at least one HVAC unit. The particular predetermined time period may be approximately 24 hours. Each of the plurality of time segments may be approximately in the range between 10 and 60 minutes.

In some embodiments, the present systems may perform the comparing by taking an arithmetic ratio of the particular predetermined time period's maximum normalized load value relative to a maximum normalized load value for a previous period of time. In other embodiments, the systems may perform the comparing by taking an arithmetic difference between the particular predetermined time period's maximum normalized load value and a maximum normalized load value for the previous time period. The maximum normalized load value for the previous predetermined time period may comprise an average of maximum normalized load values taken over a plurality of data, such as over 2 to 10 days.

In some embodiments, the maximum normalized load value for the particular predetermined time period and the maximum normalized load value for the previous predetermined time period are obtained for the same HVAC unit. In other embodiments, the maximum normalized load value for the particular predetermined time period is a first predetermined time period obtained for a first HVAC unit, and the maximum normalized load value for the predetermined time period previous to the first predetermined time period is obtained for at least a second HVAC unit.

In some embodiments, a compressor stage fault condition may be indicated when the ratio is determined to be within a compressor fault threshold range, or above a fault condition threshold. In other embodiments, an economizer fault condition may be indicated when the ratio is determined to be above an economizer fault condition threshold value and the outside air temperature is either below a lower temperature value or above an upper temperature value, wherein the lower temperature value is less than the upper temperature value.

DETAILED DESCRIPTION

Figure 1:
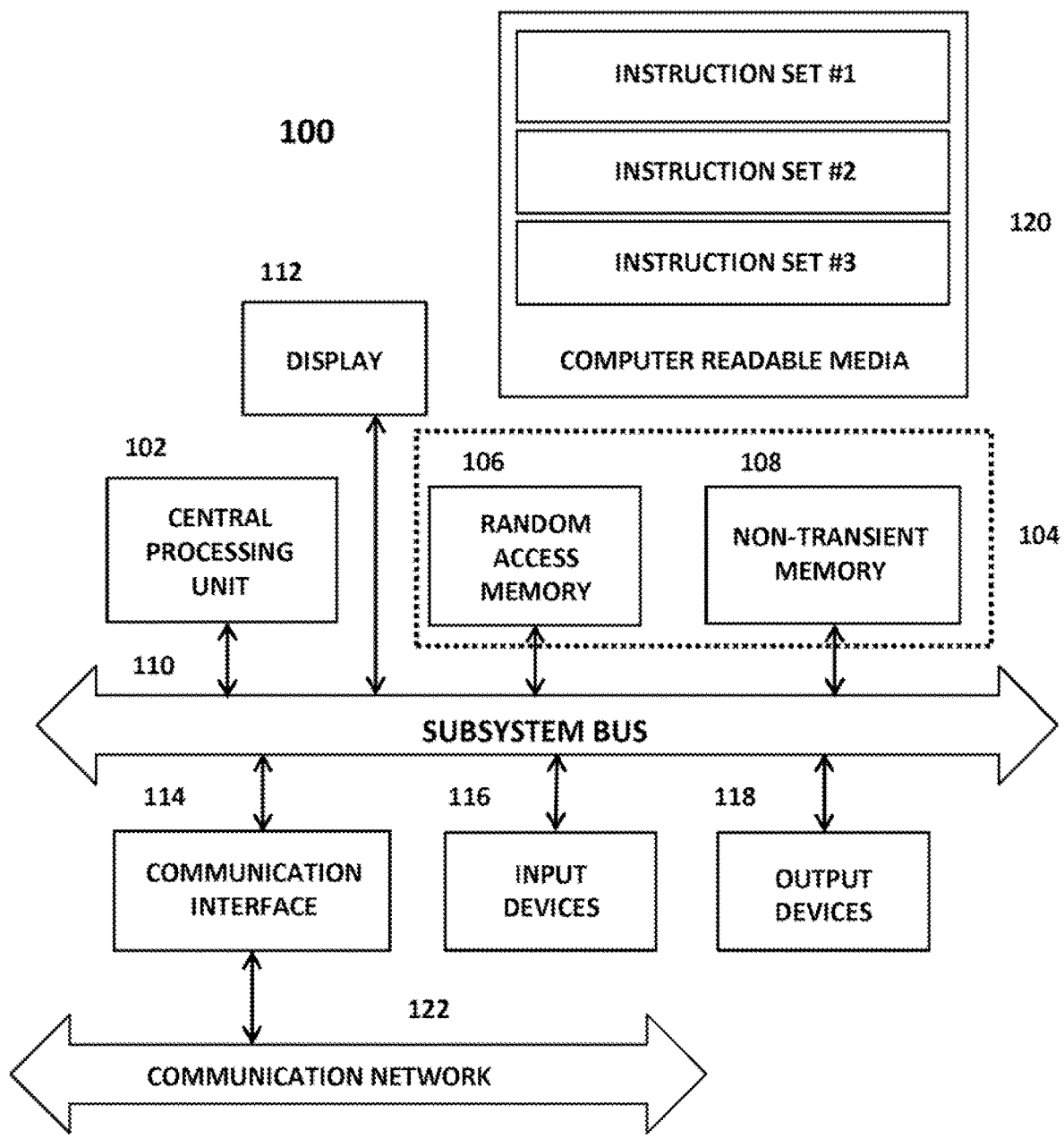
FIG. 1 provides a flow chart of the present system according to embodiments herein.

According to embodiments herein, systems and methods for monitoring and recording energy consumption data for each HVAC unit in a plurality of HVAC units to identify and diagnose one or more fault types in one or more of the plurality of HVAC units based upon their energy consumption patterns. As would be understood, the HVAC systems herein are contemplated to comprise a plurality of rooftop units, or RTUs, although a person of skill in the art would understand that many types of HVAC systems can be used.

The present system may consist of a plurality of RTUs located in a single building, in a group of proximately located buildings, or within a well-defined geographic region. The plurality of RTUs may be of similar size and type. Although not strictly required, it is advantageous that the present systems and methods can minimize the effects that variables such as weather, occupancy, and inherent differences that may exist in performance between RTUs, have on energy use data, thus enabling a more direct comparison of energy use data.

The present systems and methods may comprise collecting, storing, and analyzing historical energy consumption data for a single RTU, or for each RTU in a group of similarly situated RTUs. Some types of faults are characterized by rather slow variations, usually increases, in energy use over time, while other types of faults exhibit rather abrupt changes in energy consumption. The former fault type, which includes compressor refrigerant leaks, clogged ducts, etc., are relatively harder to identify than more abrupt changes that can occur when temperature sensors, compressor motors, or economizer dampers fail. Both slowly occurring and abrupt faults can be detected by the present invention, but examples of application to the latter fault type will be emphasized in the interests of clarity.

In some embodiments, a plurality of substantially identical RTUs may be situated at a given site, such as a commercial or industrial building. More particularly, the RTUs may all be multi-stage units with two stages of cooling and are all initially operating normally without faults. Over the course of a single day, all of the RTUs may have qualitatively similarly varying load profiles, although each RTU will have its own quantitatively unique profile that reflects its particular served zone's varying ambient conditions. These varying conditions can include heat load due to weather, occupancy, and setpoint temperature, to name a few. Often, many of a particular zone's ambient conditions will largely repeat on a periodic basis; e.g., exhibit hourly, daily, weekly, and monthly power usage patterns. For example, occupancy and the operation of power equipment in commercial and industrial environments will be similar from day to day, or at least for weekdays or weekends. On the other hand, changes in weather can have large and non-cyclic effects, and which can at times occur rather abruptly.

In such embodiments, the present system contemplates performing fault detection by collecting energy consumption data for a particular RTU, and for other RTUs where there is a plurality of similarly situated RTUs. Energy consumption data can be derived from any type of existing or deployed energy sensors including, for example, a current transformer, or any other suitable power or energy sensor. If the type of sensor employed is sensitive to current flow, such as a current transformer, then sensor output voltage is proportional to delivered power, or "load", and energy consumption is proportional to sensor output integrated over time. As such, sensors may be deployed for each RTU in the plurality of RTUs. The use of similar or identical sensors simplifies the comparison of energy consumption between RTUs by avoiding the necessity of calibrating the sensors with respect to each other or in terms of their units of measure, such as Watt, BTU, etc.

As disclosed in U.S. Pat. No. 8,527,109 to Kulyk and Kerbel, load enabled utilization values can be calculated from energy sensor data. As the phrase "load enabled utilization value" suggests, these values are determined over time segments during which a load, for example a RTU, is enabled and can cycle according to its own control system's unhindered function. More specifically, power or energy consumption measurements are preferably made for conditions that yield a quantity that represents the degree to which a load is operating over a given time period. Quantities that represent load enabled utilization values can be derived in terms such as the average power level or the total energy consumption of the load over a specified time period. More specifically, power or energy consumption measurements are preferably made over time periods and for conditions that yield a quantity that represents the average power level for that particular load operating under those particular conditions. Preferably, the conditions are normal or typical conditions in terms of factors such as thermostat set point, occupancy, weather conditions, etc.

For example, with a multi-stage RTU, energy consumption is measured while the RTU is operating with one, two, or more stages of heating or cooling under the control of its own native control system. A RTU's load sensor data can be collected periodically over specified plurality of time segments, such as in the range of 10 to 60 minutes, or 10 to 30 minutes, and average current levels drawn by the load corresponding to each time segment can be calculated. These average current values can be understood as corresponding to the total energy consumed by the load during each of the respective plurality of time segments, which may include periods during which the load is cycling on and off or between various operating stages according to its normal operation as imposed by its native control system. The methods of fault detection described herein can thus rely generally on comparing time segment energy consumption values obtained, typically on a daily basis, with corresponding values obtained for preceding days.

An example of a type of load enabled utilization value is a ratio, which is derived whereby a load's energy consumption, averaged over a suitable time segment, is divided by the highest averaged consumption level for any previously observed time segment. Alternatively, the load's time-segment averaged energy consumption can be divided by an estimated maximum value based on, for example, the RTU's maximum rated power. In this way, the power or energy consumption of each RTU is normalized relative to its own energy consumption potential, thereby providing a better basis for comparisons between RTUs having different energy consumption capacities. For simplicity, such normalized load enabled utilization values will be referred to hereinafter as "NLVs." Regardless of the particular method or equipment used to measure power or energy consumption, calculated NLV values should represent a fraction or percentage that indicates the relative extent to which a particular energy consuming device is operating relative to a benchmark maximum level for that device. In certain embodiments, measurements of the total energy consumption of the RTU, including fans or blowers, compressors, and related equipment are used to compute NLVs.

In some circumstances it may be preferable to isolate the energy consumption of particular RTU components, such as compressors or fans, in order to focus the fault diagnostics on those particular components. Accordingly, in some embodiments, only the principal energy consuming elements of the RTU, such as compressors or furnaces, are measured for this purpose. Suitable means for performing the types of measurements and calculations described above are known.

Detection of RTU faults can be automated by setting maximum and/or minimum fault level thresholds that represent a normal range of variation for the NLV of a RTU in a given time period, for example over the course of a day. It has been determined that Daily Maximum NLV or "DMNLV" metric is a strong indicator of RTU malfunction. For example, if a current day's DMNLV is less than half (50%), or more than twice (200%) of the preceding five days' NLV moving average, then an exception can be set, and a fault advisory recorded or transmitted to a system manager. The threshold for flagging a given fault advisory can be adjusted to reduce false positives to an acceptable level while still being sufficiently sensitive to an actual fault condition. To further ensure that an error indication is not a false positive, the fault detection procedure can include requiring the DMNLV to be outside a specified fault level threshold for two or more successive days. The same DMNLV-based algorithms that signal a fault condition can also be used as a basis for determining when a fault or faults have been corrected. Alternatively, different algorithms could be used for determining if a fault or faults have been corrected.

As a further guard against false positives, changes in a particular RTU's DMNLVs can be compared with those of other similarly situated RTUs in the group. Such a comparison could be utilized to account for abrupt changes in weather conditions, or other global factors that affect all similarly situated RTUs and which are not related to faults. For example, if a fault condition based on an atypical change in DMNLV occurs for a particular RTU, the fault detection system can compare the particular RTU's DMNLV with those of one or more other similarly situated RTUs to determine if they have exhibited similar changes in DMNLV or registered a fault condition over the same time period. If similar changes in DMNLV are found to occur in two or more similarly situated RTUs, then the system can b e configured to conclude that the fault indication determined by exceeding an upper or lower bound as described above is not due to an RTU fault, but rather to a change in global conditions such as weather, in which case the system would disregard a fault level condition determined for any particular RTU.

For purposes of detecting a variety of possible fault conditions, each RTU's DMNLV can be compared with previous days' DMNLVs. For example, each DMNLV can be compared with an average of two or more previous days' DMNLVs. In some embodiments, each DMNLV can be compared with several immediately preceding days' DMNLVs. In some embodiments, each DMNLV can be compared with an average of several DMNLVs taken over a previous number of days. In yet another embodiment, each DMNLV can be compared with an average of several DMNLVs taken over a number of immediately preceding days. The number of preceding days over which DMNLVs are averaged can be in the range of, for example, two to ten days. More specifically, the number of days for which the DMNLVs are averaged can be the immediately preceding five days. In addition, the days for which DMNLVs are average can be the preceding five days for which the outside temperature did not vary from the most recent day's temperature by more than a predetermined value. Alternatively, the days for which DMLVs are averaged can be any previous days for which the outside temperature did not vary from the most recent day's temperature by more than a predetermined value. Averages can be computed as a simple average, a moving average, a recursive average, or any other suitable average over any suitable previous time period.

One general category of faults that have been observed to be identifiable based on consideration of energy consumption data includes those faults whereby one or more energy consuming components of a RTU fail to energize, thereby resulting in a significant reduction in the DMNLV of the faulty RTU. One example of such a fault is where one stage of a multistage compressor of an RTU in a plurality of similar RTUs fails to energize (e.g. a "compressor stage fault"). Fault detection in this example may comprise noting, for each day, a DMNLV for each RTU within the plurality of similarly situated RTUs and comparing the most recent DMNLV with DMNLVs observed during previous days. Of course, the above assumes that the plurality of RTUs had been previously operating fault free and for which DMNLVs, obtained as described above, have been determined for each RTU over a period of days, and preferably weeks or months.

By way of a non-limiting example, each day's DMNLV can be an average of several of that day's highest measured NLVs. More specifically, DMNLVs can be determined in terms of average power or energy consumption measured over a plurality of consecutive time segments. For example, average power or energy consumption could be determined on an hourly basis, in which case the DMNLV would be the highest of the average hourly NLVs observed over a particular predetermined time period, such as over a 24 hour time period.

In embodiments for detecting failure of one or more stages of a multi-stage RTU, a ratio can be obtained wherein a RTU's most recent day's DMNLV is divided by a previous predetermined time period, such as by the average of a number of its preceding days' DMNLVs. The number of preceding days can be in the range of, for example, two to ten days. The number of preceding days can be five days. Where a DMNLV ratio is less than a predetermined fault level threshold value or range, further diagnostics can be performed. For example, further diagnostics may be performed when the ratio is less than 0.5, less than 0.25, or any other appropriate threshold value or range. Further diagnostics may include computing similar preceding days' DMNLV ratios for other similarly situated RTUs; i.e., for each similarly situated RTU, dividing the most recent day's DMNLV by the average DMNLV for a preceding number of days (using the same number of preceding days as for the RTU being diagnosed).

In order to reduce the chance of including days for which DMNLVs are unusual for non-failure reasons, such as might occur when one or more of the preceding days' temperatures are unusually cold, and therefore not requiring more than one stage of RTU cooling, any days for which the DMNLV is less than a minimum sampling value may be ignored. This applies both for the suspect RTU and for the other similarly situated RTUs. For example, DMNLVs can be averaged over the preceding five days for which the DMNLV is greater than a minimum value in the range of 0.0-0.6, in the range of 0.0-0.4, or any other suitable range. Ignoring the days for which the DMNLVs are not above the indicated minimum range, an average DMNLV for the similarly situated RTUs can be calculated and compared with the DMNLV for the suspected faulty RTU. This comparison can be made on the basis of a ratio or a difference.

A failure of one or more stages of a multi-stage RTU may be indicated and a fault reported when the ratio of the suspected faulty RTU's DMNLV to an average of its historical DMNLVs, or for similarly situated RTU's DMNLVs, is less than a minimum value. In some embodiments, the minimum value for this ratio can be a fault threshold range between 0.0-0.75, 0.0-0.5, or any other suitable range.

An arithmetic difference may also be taken between the average DMNLV of similarly situated RTUs' DMNLV and a suspected faulty RTU's DMNLV. A failure of one or more stages of a multi-stage RTU may be indicated and a fault reported when the difference is between a specified fault threshold range. In some embodiments, a fault may be reported when the difference is in the range of 0.1-1.0, 0.2-1.0, 0.5-1.0, or any other suitable range. Preferably, a fault is not reported unless the fault conditions persist for at least two consecutive days. By analyzing NLV data, it has been discovered that significant and abrupt decreases in DMNLVs are indicative of an RTU fault, and in particular, to the failure of one or more stages in a multi-stage RTU. It has been further noted that correction of the fault correlated with a return of a defective RTU's DMNLV to earlier, fault-free levels.

Having regard to FIG. 1, systems for implementing the present fault detection and diagnostic methods can be carried out by means of software instructions executed by a computing system. The computing system can be part of a pre-existing Direct Digital Control ("DDC"), Supervisory Control and Data Acquisition ("SCADA"), a Building Automation System ("BAS"), or any other system known in the art. DDC, SCADA and BAS systems are typically networked using the BACnet protocol and are specifically designed for building automation applications. These systems typically include measurements of individual equipment power and energy consumption. Thus, the methods and systems described herein can often be implemented by means of a software application within an existing HVAC control system, or with minimal additional hardware, e.g. equipment power sensors and/or outdoor temperature/enthalpy sensors.

Software applications with instructions that, when executed, carry out the described fault detection analysis can be incorporated into an existing BAS, or can reside in a remotely located computing machine that communicates with a BAS by means of the Internet, a BACnet network, or other communication system or protocol. A remotely located computing machine can, for example, provide the analysis software as a service ("SaaS") by means of a "Cloud" based system. FIG. 1 depicts an exemplary diagrammatic representation of a machine in the form of a computer system 100 within which a set of instructions, when executed, can cause the machine to perform any one or more of the methods describe above. In some embodiments, the machine may be connected to other machines. In a networked deployment, the machine may operate in the capacity of a server or a client user machine in client-server user network environment, or as a peer machine in a peer-to-peer (or distributed) network environment.

The machine 100 may comprise a server computer, a client user computer, a personal computer (PC), a tablet PC, a smartphone, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methods discussed herein.

Computer system 100 may include any or all of a processor (or controller) 102 (e.g., a central processing unit (CPU), which may include an integrated or discrete graphics processing unit), a main memory 104 comprising a volatile memory 106 such as random access memory, and a tangible, non-volatile memory 108, which communicate with each other via a bus 110. Main memory 104 may comprise volatile random access memory 106 such as DRAM or SRAM, and the static non-volatile memory 108 may comprise a Winchester drive, a solid state flash drive, or any suitable non-volatile data storage medium. Computer system 100 may further include a display 112; e.g., a liquid crystal display (LCD), a flat panel, or a solid state display. Computer system 100 may include user input devices 116 (e.g., keyboard, mouse, microphone, etc.) and output devices 118 (e.g., speaker, printer, etc.). Computer system 100 may also include means for communicating with other computer systems and devices for purposes such as receiving energy and temperature data and sending control signals and fault analysis results. Some embodiments described herein can be adapted to utilize multiple display units 112 controlled by two or more computer systems 100. In some configurations, display images may be shown in part in a first of the display unit 112, while the remaining portion is presented in a second of the display unit 112. In other configurations, display images can be communicated to remotely located computer systems for display on their associated display units.

Energy consumption and temperature data used for fault analysis as described herein are received by the computer system 100 by means of communication interface 114 and communication network 122. These fault analysis related data are processed by central processing unit 102 and stored in main memory module 104 as volatile and/or non-volatile digital data in sections 106 and 108, respectively. Central processing unit 102 is configured to further process these data according to one or more instruction sets 120 residing in non-transient memory module 108 so as to carry out fault analysis according to the methods and procedures described herein. Communication interface 114 may communicate by either a wired or wireless connection with communication network 122. Communication network 122 may comprise a single network type or protocol, or multiple network types or protocols that may include wired and/or wireless modes of communication. For example, communication network 122 may include local area networks such as WiFi or Zigbee and wide area networks such as the Internet. Communication interface 114 and communication network 122 are operably configured to receive and transmit data to and receive data from remote locations such as where RTUs may be located, or with BAS, BMS, or any such systems that monitor and control RTUs or similar devices.

Static, tangible, non-volatile memory unit 108 may be used to store one or more sets of instructions (e.g., software 120) for implementing any one or more of the methods or functions described herein. Software instructions 120 may also reside, completely or at least partially, within the main memory 104, the volatile memory 106, and/or within the processor 102 during execution thereof by the computer system 100.

The main memory 104 and the processor 102 also may constitute tangible, non-volatile computer-readable storage media upon which resides, for example, the system BIOS.

While the tangible, non-volatile computer-readable storage medium 108 is shown in an example embodiment to be a single medium, the phrase "tangible nonvolatile computer-readable storage medium" should be taken to include a single medium or multiple media (e.g., a centralized or distributed database, and/or associated caches and servers) that store the one or more sets of instructions. The phrase "tangible, non-volatile computer-readable storage medium" shall also be taken to include any non-transitory medium that is capable of storing or encoding a set of instructions for execution by the machine and that cause the machine to perform any one or more of the methods of the subject disclosure.

The phrase "tangible, non-volatile computer-readable storage medium" shall accordingly be taken to include, but not be limited to: solid-state memories such as a memory card or other package that houses one or more read-only (non-volatile) memories, magneto-optical or optical media such as an optical disk, magnetic tape, or any other tangible media which can be used to store information in an essentially permanent form. Accordingly, the disclosure is considered to include any one or more of a tangible computer-readable storage medium, as listed herein and also including art-recognized equivalents and successor media, in which the software implementations of methods and systems described herein are stored.

Dedicated hardware implementations including, but not limited to, application-specific integrated circuits, programmable logic arrays and other hardware devices that can likewise be constructed to implement the methods described herein. Application-specific integrated circuits and programmable logic arrays can use downloadable instructions for executing state machines and/or circuit configurations to implement embodiments of the subject disclosure. Applications that may include the apparatuses and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

The operations or methods described herein are intended for operation as software programs or instructions running on or executed by a computer processor or other computing device, and which may include other forms of instructions manifested as a state machine implemented with logic components in an application-specific integrated circuit or field programmable array. Furthermore, software implementations (e.g., software programs, instructions, etc.) which can include, but are not limited to, distributed processing or component/object distributed processing, parallel processing, or virtual machine processing, can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

Although components and functions implemented in the disclosed embodiments are provided with reference to particular standards and protocols, it should be understood that the present systems may no be limited to such standards and protocols. Each of the standards for Internet and other network transmission protocols (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, ZigBee, Z-Wave), and long-range communications (e.g., GSM, CDMA, WiMAX, LTE, etc.) can be used by computer system 100.

Figure 2A:
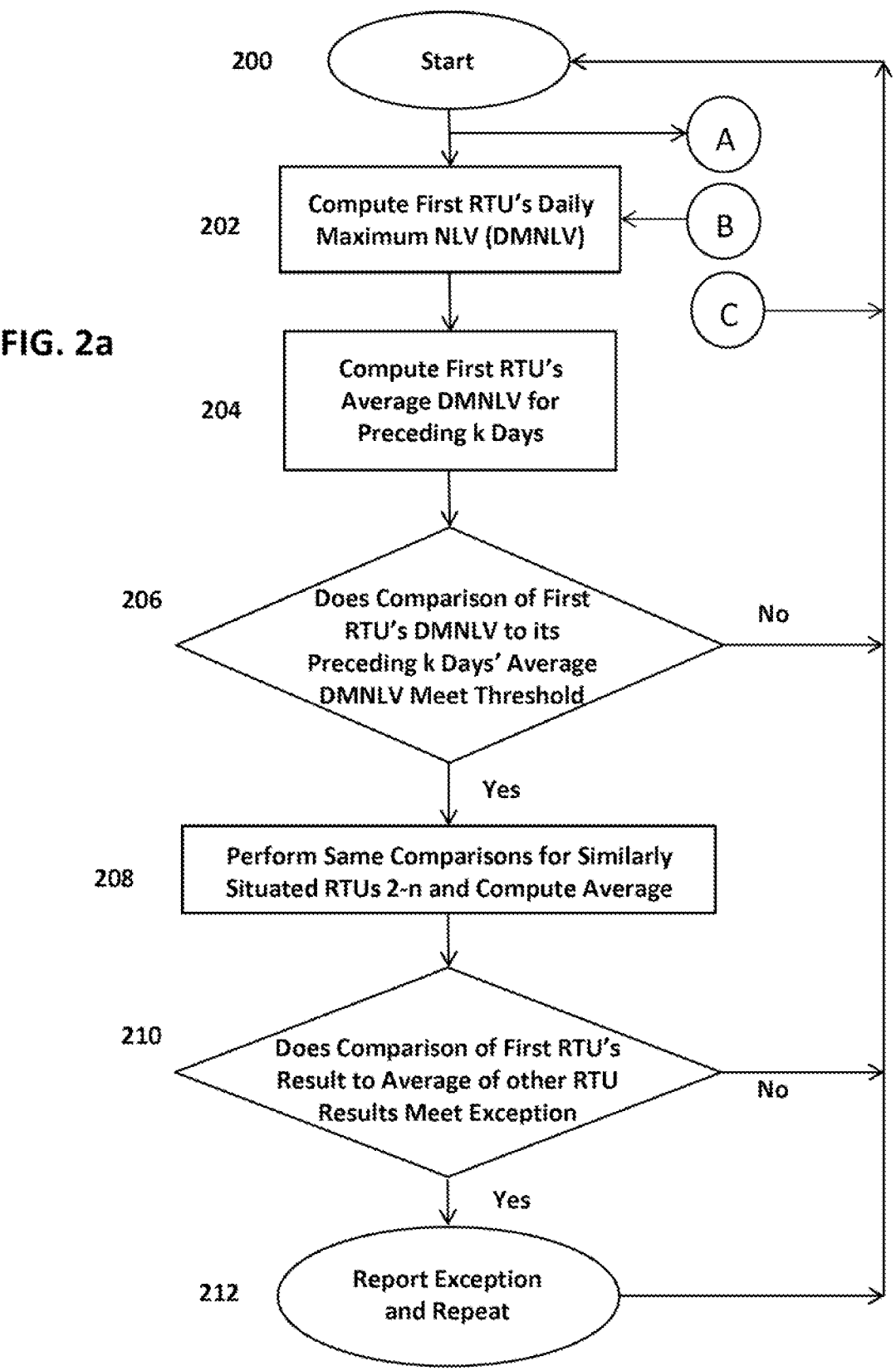
FIG. 2a illustrates the steps in a method for carrying out an exemplary embodiment for detecting a fault condition in a RTU.
Figure 2B:
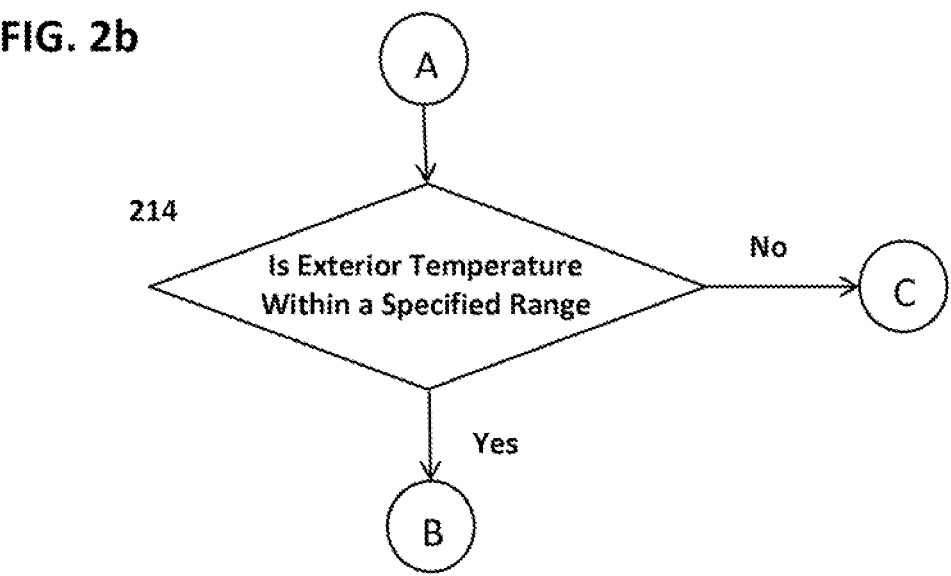
FIG. 2b illustrates additional steps to the method shown in FIG. 2a, the steps providing a method for carrying out an exemplary embodiment for detecting a fault condition in a RTU wherein an economizer damper is stuck in either a substantially open or a substantially closed position.

Having regard to FIGS. 2*a* and 2*b*, steps for performing fault detection analysis in the case of failure of one or more stages of a multi-stage RTU according to the foregoing procedure based on ratios of faulty to fault-free DMNLVs are presented. The process starts at step 200 and proceeds to step 202 where the DMNLV for a predetermined period of time (e.g. each 24 hour day) is computed using available energy consumption versus time data. The process then proceeds to step 204 where the average DMNLVs for a previous predetermined time period (e.g. the k days' preceding the predetermined time period) is computed. Then, at 206, the predetermined time period's from step 202 is divided by the average of the preceding k days' DMNLVs from step 204 to obtain a DMNLV ratio $R_1$. If the ratio $R_1$ has a value greater than a threshold value m, then the process repeats at some suitable frequency; e.g., once a day for each RTU. If, on the other hand, the ratio $R_1$ is less than m, the process proceeds to step 208 where ratios $R_2$ to $R_n$ are computed as described above for $R_1$ for each of the n−1 other similarly situated RTUs, and an average value $R_a$ of the ratios $R_2$ to $R_n$ is computed. The process proceeds next to 210 where a comparison is then made between $R_1$ and the average $R_a$ of the other similarly situated RTUs. If the comparison fails to meet any of the fault criteria described above, the process repeats on a periodic basis. If the comparison does meet one of the fault criteria described above (e.g. a compressor stage fault condition or an economizer fault condition), the process proceeds to 212 where a fault report is automatically reported and the appropriate individual(s) are alerted. A fault report may not be generated, or an individual alerted until the fault conditions repeat, for example, for two successive days. The process then returns to 200 and repeats for each similarly situated RTU at appropriate regular intervals, which in a preferred embodiment would be at least once each day. It will be appreciated that, for reasons of expediency, and for a sufficiently large group, the average $R_a$ can be taken over all of the similarly situated RTUs, including the RTU under test, $R_1$.

The above process can be performed using arithmetic differences between DMNLVs as opposed to ratios, wherein the above steps are unchanged except for the following. At step 206, the difference between the current day's DMNLV from step 202 and the average of the preceding k day's DMNLVs from step 204 is calculated to obtain a DMNLV difference $D_1$. If $D_1$ has a value outside of threshold band b, then the process repeats at some suitable frequency; e.g., once a day for each RTU. If, on the other hand, the difference $D_1$ is within band b, the process proceeds to step 208 where differences $D_2$ to $D_n$ are computed as described above for $D_1$ for each of the n−1 other similarly situated RTUs, and an average $D_a$ of the differences $D_2$ to $D_n$ are computed. The process proceeds next to 210 where a comparison is made between $D_1$ and the average $D_a$ of the other similarly situated RTUs. If the comparison fails to meet any of the fault criteria described above, the process repeats on a periodic basis. If the comparison does meet one of the fault criteria described above, the process proceeds to 212 where a fault report is automatically reported and the appropriate individual(s) are alerted. As above, a fault report may not be generated, or an individual alerted, until the fault conditions repeat, for example, for two successive days.

The above analysis for detecting RTU faults, wherein the fault is associated with a significant drop in energy consumption, can be extended with only minor modification to cases where the fault is associated with a significant increase in energy consumption. As noted above, many types of HVAC faults are associated with a concomitant losses in efficiency; hence, the average energy consumption of an HVAC RTU having any one of a number of possible faults will likely exhibit generally higher energy usage than it did in a previously fault-free state, or than similarly situated and fault-free RTUs. In this scenario, where the fault is associated with an increase in average energy consumption, the fault detection procedure follows the same basic steps outlined with respect to FIG. 2a. As above, the DMNLV forms the basis for detecting a fault condition. However, instead of detecting for an unexpected decrease in DMNLV, the process relies on detecting for an unexpected increase in the DMNLV. In other regards, the analysis is similar; e.g., comparing the suspect RTU's DMNLV with its previous average DMNLV where, in this case, the suspect RTU's DMNLV is larger than an average of its previous DMNLVs and/or its cohort RTUs' DMNLVs by some threshold value p, where p may be a ratio or an arithmetic difference. As compared to the previous exemplary case, it may be more appropriate to compute the DMNLV over a longer time period, since some types of faults may cause the RTU to run longer rather than at a higher power level.

In some cases, in order to detect a fault associated with an increase in energy consumption, a ratio of a RTU's DMNLV relative to its average DMNLV over a previous time period can be computed and, if this ratio is greater than a fault condition threshold value p, a further diagnostic is performed. In some embodiments, the fault condition threshold ratio value p can be in the range greater than 1.0. If the threshold DMNLV ratio p is exceeded, then the suspect RTU's DMNLV ratio is compared to DMNLVs computed on the same basis and in the same manner for other similarly situated RTUs. A fault can automatically be reported when a ratio $R_1$ of the suspect RTU's DMNLV to an average of the DMNLVs of the similarly situated RTUs exceeds some predetermined fault condition threshold value. If this ratio is greater than a threshold value, a fault is reported. The fault condition threshold ratio value could 2.0, or preferably, the fault condition threshold value could be 1.5. In other embodiments, a difference can be taken between the average of the DMNLVs of similarly situated RTUs and the DMNLV of the suspect RTU. In some cases, if the computed difference is less than −0.5, then a fault is reported. In other cases, if the computed difference is less than −0.25, then a fault is reported. In general, RTU faults associated with increased energy consumption and decreased energy consumption are determined analogously.

Economizers are one of the most frequent points of RTU failure. Economizer fault conditions can be the result of an actuator motor failure, a link failure, or a jammed damper blade. As previously noted, if a damper is stuck open it forces the RTU's cooling system to work harder in the summer and the heating system to work harder in the winter. Conversely, if a damper is stuck closed, the RTU's cooling system works harder in cool weather and the heating system works harder in warmer weather. Thus, economizer damper malfunctions of all types generally degrade the efficiency and increase the energy consumption that the economizer was designed to deliver. Accordingly, systems are presented for identifying economizer damper fault conditions, particularly where, for example, an outside air temperature is either below a lower temperature value or above an upper temperature value, wherein the lower temperature value is less than the upper temperature value. DMNLV data can be used, together with outside temperature data, to detect a possible economizer outside air damper fault; i.e., an economizer damper stuck open or stuck closed, either partially or fully.

By way of example, a properly functioning outdoor air damper typically mixes outdoor air with HVAC system indoor return air in the range 30°-75° F. (−1°-+24° C.). Typically, during cool weather a properly functioning economizer damper operates in "modulated" mode whereby a target inside temperature is maintained without any additional mechanical cooling. The outside temperature range for this mode of operation is typically 30°-55° F. (−1°-13° C.). For milder weather conditions, typically in the range 55°-75° F. (13°-24° C.), the economizer operates in "integrated" mode whereby additional mechanical cooling (e.g., compressor/evaporator systems) is required. The full temperature range over which a damper is configured to modulate outside air intake may be chosen according to the energy content or enthalpy of the outside air; for low outside air humidity, the economizer modulating range may be configured to operate below 65° F., whereas in geographical areas with typically higher humidity levels, the operating range may be set to below 55° F. Whether operating within the "modulated" or "integrated" economizer temperature ranges, a malfunctioning damper may cause the RTU to consume more energy in terms of compressor function and fan speed.

In normal cooling mode, the economizer outside air damper opens to allow more outside air when the outside temperature or enthalpy (including moisture content) is such that including outside air will reduce the load on the cooling system, principally the compressors. More particularly, if the outside temperature or enthalpy is below a predetermined level, then in normal operation the economizer damper opens thereby reducing the load on the RTU. Conversely, if the outside temperature or enthalpy is above a predetermined level, then in normal operation the economizer damper is at least partially or fully closed to reduce the cooling load on the RTU. A reduced RTU load will be reflected in reduced DMNLV levels.

A previously normally operating RTU's outside air damper can become stuck and cease to properly modulate the mixing of external with return air. If this now faulty RTU's DMNLV is compared with historical values for days with similar outside temperatures or enthalpies, a marked increase in DMNLV for the current period can signify some type of fault, including but not limited to a stuck outside air damper fault. Whether outside temperature or outside enthalpy data are preferred in the analysis depends, at least in part, on which of the two types of measurement is used by the economizer control system. Similar or analogous fault detection analyses can be performed whether a damper stuck is open or stuck closed. For the stuck open case, the analysis is performed when the outside temperature (or enthalpy) is above a predetermined threshold $T_O$, where a normally functioning economizer should be substantially or completely closed. Similarly, a possible stuck closed condition is tested for when the outside temperature (or enthalpy) is below a predetermined threshold $T_C$, in which case a normally functioning economizer should be substantially or completely open. For either of these two temperature or enthalpy regimes, a fault may be indicated when a RTU's DMNLV exceeds a predetermined value R. The same or different values of R may be assigned for the two temperature regimes.

Similar to the detection of other RTU fault conditions such as compressor stage failures, etc., the detection of an economizer fault conditions can be automated by setting thresholds in substantially the same manner as previously described for other types of faults. That is, a fault condition may be indicated when the current DMNLV deviates by more than a predetermined extent from the average of a previous number of days' DMNLVs. However, in this particular case, the days selected for comparison may be limited to those that fall within a reasonably narrow margin of the current day's temperature or enthalpy. As a non-limiting example, a RTU fault condition could be signaled if the current DMNLV is more than 25% greater than the average of DMNLVs for its five most recent days in which the maximum or average temperature for the day was within ±2 degrees Fahrenheit of the current day's maximum or average. The particular fault thresholds used can be adjusted to achieve acceptable false positive errors while still retaining sufficient sensitivity to fault conditions. It is noted that, in lieu of actually measuring outside temperature or enthalpy, temperature and humidity data for the region or area can be obtained from the National Weather Service or other national or local weather sources.

The steps for detecting an economizer fault proceed as depicted in FIG. 2a except that it includes a test, as shown in FIG. 2b, where by a determination is made as to whether the outside air falls within one of two temperature or enthalpy regimes. The process starts at step 200 and proceeds to 214 where the current outside temperature is compared with reference temperatures (or enthalpies) $T_C$ and $T_O$. These reference temperatures (or enthalpies) are chosen such that, under normal fault-free operation, the economizer damper is expected to be either substantially open (below $T_C$) or substantially closed (above $T_O$), respectively. The temperature range over which a particular economizer has been set to operate so as to modulate the percentage of outside air can be used as a basis for establishing temperature range limits $T_C$ and $T_O$ below and above which, respectively, the fault detection system operates. For example, in embodiments, $T_C$ may be in the range 50°-65° F., and $T_O$ may be in the range 65°-75° F. In other embodiments, thresholds $T_C$ and $T_O$ can be 55° and 70° F., respectively. If the outside air temperature is in the range between $T_C$ and $T_O$ the process repeats at some appropriate interval; e.g., once per hour. If the outside air temperature (or enthalpy) is less than $T_C$ or greater than $T_O$, the process proceeds to 202 where the fault analysis is carried out as previously described. Appropriate economizer damper fault threshold valued can be determined heuristically to reach an acceptable compromise between false negatives and false positives.

The illustrations of embodiments described herein are intended to provide a general understanding of the structure of various embodiments, and they are not intended to serve as a complete description of all the elements and features of apparatuses and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Figures depicting steps according to various embodiments do not necessarily need to proceed serially as depicted and may proceed in parallel or in another order as practical considerations dictate. Accordingly, the specification and drawings are to be regarded in an illustrative rather than a restrictive sense.

Although specific embodiments have been illustrated and described herein, it should be appreciated that any arrangement or order of execution calculated to achieve the same purpose may be substituted for the specific embodiments shown. This disclosure is intended to cover any and all adaptations or variations of the exemplary embodiments described herein. It will be appreciated that there are many further possible variations of the methods described herein, particularly in relation to more sophisticated calculation methods, and the inclusion of additional inputs. Combinations of the above embodiments, and other variations not specifically described herein but obvious to a person having ordinary skill in the associated arts, should be included in the subject disclosure.

What is claimed is:

1. A system for detecting one or more fault conditions in at least one HVAC unit in a plurality of HVAC units, the system comprising:
    at least a first sensor configured to acquire first energy consumption data pertaining to the operation of the at least one HVAC unit;
    at least a second sensor configured to acquire second energy consumption data pertaining to the operation of one or more similarly situated HVAC units; and
    a processor operative to:
        receive the first energy consumption data from the at least first sensor and the second energy consumption data from the at least second sensor;
        determine, from the first energy consumption data, a first average energy consumption value corresponding to each of a plurality of time segments over particular predetermined time periods of the operation of the at least one HVAC unit;
        determine first arithmetic ratios of the determined first average energy consumption values relative to a known or estimated first maximum average energy consumption value for the at least one HVAC unit to obtain first normalized load values corresponding to the each of the plurality of time segments in the predetermined time periods;
        determine first maximum normalized load values among the normalized load values within each of the predetermined time periods;
        determine, from the second energy consumption data, second average energy consumption values of the similarly situated HVAC units corresponding to each of the plurality of time segments over the predetermined time periods;
        determine second arithmetic ratios of the determined second average energy consumption values relative to known or estimated second maximum average energy consumption values for the similarly situated HVAC units to obtain second normalized load values corresponding to each of the plurality of time segments in the predetermined time periods;
        determine second maximum normalized load values among the second normalized load values within each of the predetermined time periods;
        compare the first maximum normalized load values to the second maximum normalized load values by taking a fourth arithmetic ratio of the particular predetermined time period's first maximum normalized load value relative to the second maximum normalized load value for the same predetermined time period, wherein a compressor failure fault condition may be indicated when the fourth arithmetic ratio is outside a compressor fault threshold range; and when the comparison of the first and the second maximum normalized load values meets one or more fault thresholds, automatically report the fault conditions in the at least one HVAC unit.

2. The system according to claim 1, wherein the particular predetermined time periods are approximately 24 hours.

3. The system according to claim 1, wherein the each of the plurality of time segments are approximately in a range between 10 and 60 minutes.

4. The system according to claim 1, wherein the compressor fault threshold range is less than 0.75 or greater than 1.5.

5. The system according to claim 1, wherein an economizer fault condition may be indicated when the fourth arithmetic ratio is above an economizer fault threshold value and the outside air temperature is either below a lower temperature value or above an upper temperature value, wherein the lower temperature value is less than the upper temperature value.

\* \* \* \* \*